US012462529B2

(12) United States Patent
Saini et al.

(10) Patent No.: US 12,462,529 B2
(45) Date of Patent: Nov. 4, 2025

(54) METHOD AND SYSTEM FOR IMAGE PROCESSING AND CLASSIFYING TARGET ENTITIES WITHIN IMAGE

(71) Applicant: L&T TECHNOLOGY SERVICES LIMITED, Chennai (IN)

(72) Inventors: Taniya Saini, Ahmedabad (IN); Niranjan Kumar Manjunath, Davangere (IN); Ashok Ajad, Gorakhpur (IN); Arbaaz Mohammad Shaikh, Satara (IN); Nisarga Krishnegowda, Mysore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 378 days.

(21) Appl. No.: 18/144,881

(22) Filed: May 9, 2023

(65) Prior Publication Data

US 2024/0087288 A1 Mar. 14, 2024

(30) Foreign Application Priority Data

Sep. 12, 2022 (IN) .............................. 202241052040

(51) Int. Cl.
*G06V 10/764* (2022.01)
*G06T 5/30* (2006.01)
*G06T 5/70* (2024.01)
*G06T 7/13* (2017.01)
*G06V 10/56* (2022.01)
*G06V 10/60* (2022.01)
*G06V 10/82* (2022.01)

(52) U.S. Cl.
CPC ............ *G06V 10/764* (2022.01); *G06T 5/30* (2013.01); *G06T 5/70* (2024.01); *G06T 7/13* (2017.01); *G06V 10/56* (2022.01); *G06V 10/60* (2022.01); *G06V 10/82* (2022.01); *G06T 2207/10024* (2013.01); *G06T 2207/20084* (2013.01)

(58) Field of Classification Search
None
See application file for complete search history.

(56) References Cited

U.S. PATENT DOCUMENTS

2020/0302168 A1\* 9/2020 Vo .......................... G06N 3/045

FOREIGN PATENT DOCUMENTS

CN 110363719 A \* 10/2019 ............... G06T 7/13

\* cited by examiner

*Primary Examiner* — Bernard Krasnic
(74) *Attorney, Agent, or Firm* — Kendal M. Sheets

(57) ABSTRACT

A method of image processing and classifying target entities with an image is disclosed that may include applying a contrast amplification procedure to a Lightness parameter associated with an input image, to amplify contrast of the input image and obtain an amplified-contrast image. The method may further include de-noising the amplified-contrast image by iteratively performing on the amplified-contrast image a blur correction, an erosion correction, and a dilation correction, to obtain a de-noised image corresponding to the amplified-contrast image. The method may further include determining edges of each of one or more target entities associated with the input image from the de-noised image and identifying the one or more target entities associated with the input image based on the identified edges, to generate a contoured image. The method may further include classifying the one or more target entities into one or more predefined classes, using a classification model.

12 Claims, 6 Drawing Sheets

METHOD AND SYSTEM FOR IMAGE PROCESSING AND CLASSIFYING TARGET ENTITIES WITHIN IMAGE

TECHNICAL FIELD

This disclosure relates generally to image processing and classification, and more particularly to a system and method for identifying cell types and abnormalities associated with blood cells from smear images, using image processing and classification.

BACKGROUND

Abnormalities of blood cells may cause various distinct types of blood disorders. Therefore, identification of these blood cells and their abnormalities can help the pathologist with the initial diagnosis and reduce their overall diagnosis efforts and time. Further, early detection of these abnormalities can help in identifying chromosome improperness during birth, excessive or incisive production of cells in the bone marrow, change in the shape and size of cells, etc.

Therefore, there is needs for specific techniques for identifying type of blood cell as to whether the cell is normal or abnormal, and further identify its sub types as to that kind of abnormality the cell is affected with. Further, there is a need for improved image processing techniques that can help with improving the quality of smear images of the cells and therefore help in accurate identification of the cell types and sub-types.

SUMMARY OF THE INVENTION

In an embodiment a method of image processing and classifying target entities within image is disclosed. The method may include applying a contrast amplification procedure to a Lightness parameter associated with an input image, to amplify contrast of the input image and obtain an amplified-contrast image corresponding to the input image. The method may further include de-noising the amplified-contrast image by iteratively performing on the amplified-contrast image a blur correction, an erosion correction, and a dilation correction, to obtain a de-noised image corresponding to the amplified-contrast image. The method may further include determining, from the de-noised image, edges of each of one or more target entities associated with the input image using at least one edge detection mode, and identifying the one or more target entities associated with the input image based on the identified edges of each of the one or more target entities, to generate a contoured image.

A system for image processing and classifying target entities with an image is disclosed, in accordance with an embodiment of the present disclosure. The system includes a processor and a memory communicatively coupled with the processor. The memory stores processor-executable instructions, which on execution, may cause the processor to apply a contrast amplification procedure to a Lightness parameter associated with an input image, to amplify contrast of the input image and obtain an amplified-contrast image corresponding to the input image. The processor-executable instructions may further cause the processor to de-noise the amplified-contrast image by iteratively performing on the amplified-contrast image a blur correction, an erosion correction, and a dilation correction, to obtain a de-noised image corresponding to the amplified-contrast image. The processor-executable instructions may further cause the processor to determine, from the de-noised image, edges of each of one or more target entities associated with the input image using at least one edge detection mode and identify the one or more target entities associated with the input image based on the identified edges of each of the one or more target entities, to generate a contoured image.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Figure 1:
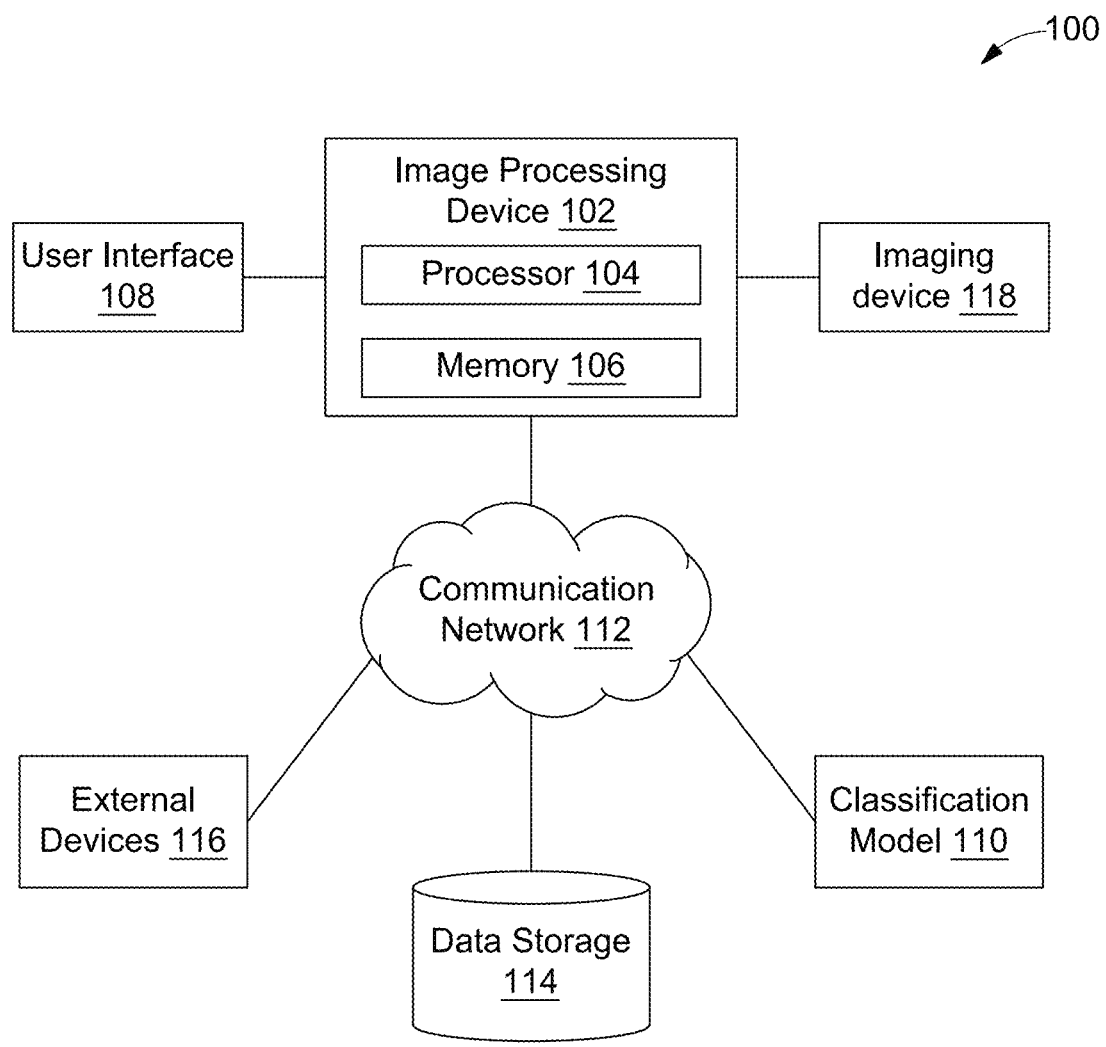
FIG. 1 illustrates a block diagram of a system for image processing and classifying target entities within an image, in accordance with an embodiment of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The human body contains approximately 7-8 percent of the body weight in blood. The blood primarily includes three major constituents red blood cells, white blood cells, and platelets. The blood cells may develop various types of abnormalities due to age or infections. Eventually, the abnormal nature of blood cells may cause distinct types of blood disorders including sickle cell anemia, leukemia, lymphoma, etc. For proper treatment, it becomes necessary to first identify the abnormalities in the blood cells. Pathologists generally rely on a variety of blood tests to identify the abnormalities. However, these blood tests are prone to errors, slow, and effort and time intensive. Delay in the results of these blood tests could hamper the progress of the line of treatment and might lead to unfavorable situations. Therefore, it is desired to develop and use advanced technological solutions to help the pathologists to generate accurate and quick diagnosis.

The present disclosure provides a for an efficient method of identifying cells as normal or abnormal out of all given cells. An image pre-processing is performed by applying a two-step iterative process. To this end, first the image, for example a smear image is reconfigured into a lightness-based configuration. For example, a BGR (Blue, Green, Red) parameter configuration is converted into LAB (Lightness, a-axis, b-axis) configuration or LUV (Lightness, u-axis, v-axis) configuration. Thereafter, contrast limited adaptive histogram (CLAHE) technique is applied only on the Lightness channel of LAB scale. Bluer correction, erosion correction, and dilation correction is applied to remove noise from the image, and these steps may be repeated to enhance the overall image quality. Thereafter, edge detection and contour methods are used to separate the cells within the image. Further, the input image is passed through a segmentation model and the output of segmentation model along with the contoured cells are fed to a classification model to identify the cell type and their nature.

The above rigorous image processing is used to make the (smear) image suitable for training and inferencing for both classification and segmentation. As such, the image preprocessing is a significant part of the modelling process. By way of these techniques, blood cell analysis for disease prediction is automated and made more efficient. Further, the techniques can be used for diagnosing blood-related diseases by analyzing the blood cells.

Referring now to FIG. 1, a block diagram of a system 100 for image processing and classifying target entities within an image is illustrated, in accordance with an embodiment of the present disclosure. The system 100 includes an image processing device 102, a user interface 108, and an input/output device 118. The image processing device 102 may be a computing device having data processing capability. In particular, the image processing device 102 may have the capability to process the input images by performing contrast amplification, denoising, segmentation, and a classification to determine the target entities present in the input image. To this end, the image processing device 102 may be communicably coupled with a classification model 110. Examples of the image processing device 102 may include, but are not limited to a desktop, a laptop, a notebook, a netbook, a tablet, a smartphone, a mobile phone, an application server, or a web server.

In some embodiments, the system 100 may further include an imaging device 118. The imaging device 118 may generally include one or more cameras, such as a high-resolution camera to generate an input image from the given blood smear. Further, in some embodiments, the imaging device 118 may be implemented in an image processing device. The system 100 may further include a data storage 114. For example, the data storage 114 may store various types of data required by the image processing device 102 for performing and classifying the target entities in an image. For example, the data storage 114 may store one or more images captured by the imaging device 118.

The image processing device 102, along with the user interface 108 and image input device 118, may be communicatively coupled to the data storage 114, the classification model 110, and external devices 116 via a communication network 112. The communication network 112 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). Various devices in the system 100 may be configured to connect to the communication network 112, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, Light Fidelity (Li-Fi), 802.16, IEEE 802.11s, IEEE 802.11g, multi-hop communication, wireless access point (AP), device to device communication, cellular communication protocols, and Bluetooth (BT) communication protocols.

The image processing device 102 may be configured to perform one or more functionalities that may include receiving a plurality of input images from a sample of blood smear. The one or more functionalities of the image processing device 102 is performed in conjunction with the classification model 110 coupled with the image processing device 102. The classification model 110 may perform the classification of the input image of the blood smear using the Convolutional Neural Network (CNN) model. Further, the classification model 110 performs the classification by iteratively performing a plurality of processes including applying a contrast amplification procedure to a Lightness parameter associated with an input image, followed by de-noising the amplified-contrast image by further iteratively performing on the amplified-contrast image a blur correction, an erosion correction, and a dilation correction, followed by determining edges of each of one or more target entities associated with the input image, and identifying the one or more target entities associated with the input image based on the identified edges. Further, based upon the classification by the classification model 110, the image processing device 102, may generate a mask image comprising the one or more target entities and the mask associated with each of the one or more target entities using a segmentation model and finally obtain classification of the one or more target entities into one or more predefined classes using a classification model. The above process is further explained in conjunction FIG. 2.

In order to perform the above-discussed functionalities, the image processing device 102 may include a processor 104 and a memory 106 coupled to a user interface device 108. The processor 104 may include suitable logic, circuitry, interfaces, and/or code that may be configured to correct the reflection region of an image. The processor 104 may be implemented based on temporal and spatial processor technologies, which may be known to one ordinarily skilled in the art. Examples of implementations of the processor 104 may be a Graphics Processing Unit (GPU), a Reduced Instruction Set Computing (RISC) processor, an Application-Specific Integrated Circuit (ASIC) processor, a Complex Instruction Set Computing (CISC) processor, a micro-controller, Artificial Intelligence (AI) accelerator chips, a co-processor, a central processing unit (CPU), and/or a combination thereof. The memory 106 may include suitable logic, circuitry, and/or interfaces that may be configured to store instructions executable by the processor 104. The memory 106 may store instructions that, when executed by the processor 104, may cause the processor 104 to initiate the classification of the input image. The memory 106 may be a non-volatile memory or a volatile memory. Examples of non-volatile memory may include, but are not limited to a flash memory, a Read-Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM). The memory 106 may also store various data that may be captured, processed, and/or required by the system 100.

The image processing device 102 may further be coupled with a user interface 108. The user interface 108 may receive input from a user and also display an output of the computation performed by the processor 104. For example, the user input may include the input images of a blood smear to be subjected for classification and segmentation. Further, the user interface 108 may include a display screen that is capable of displaying the final results.

Additionally, the image processing device 102 may be communicatively coupled to an external device 116 for sending and receiving various data. Examples of the external device 116 may include, but are not limited to, a remote server, digital devices, and a computer system. The image processing device 102 may connect to the external device 116 over the communication network 112. The image processing device 102 may connect to external device 116 via a wired connection, for example via Universal Serial Bus (USB). A computing device, a smartphone, a mobile device, a laptop, a smartwatch, a personal digital assistant (PDA), an e-reader, and a tablet are all examples of external devices 116.

Figure 2:
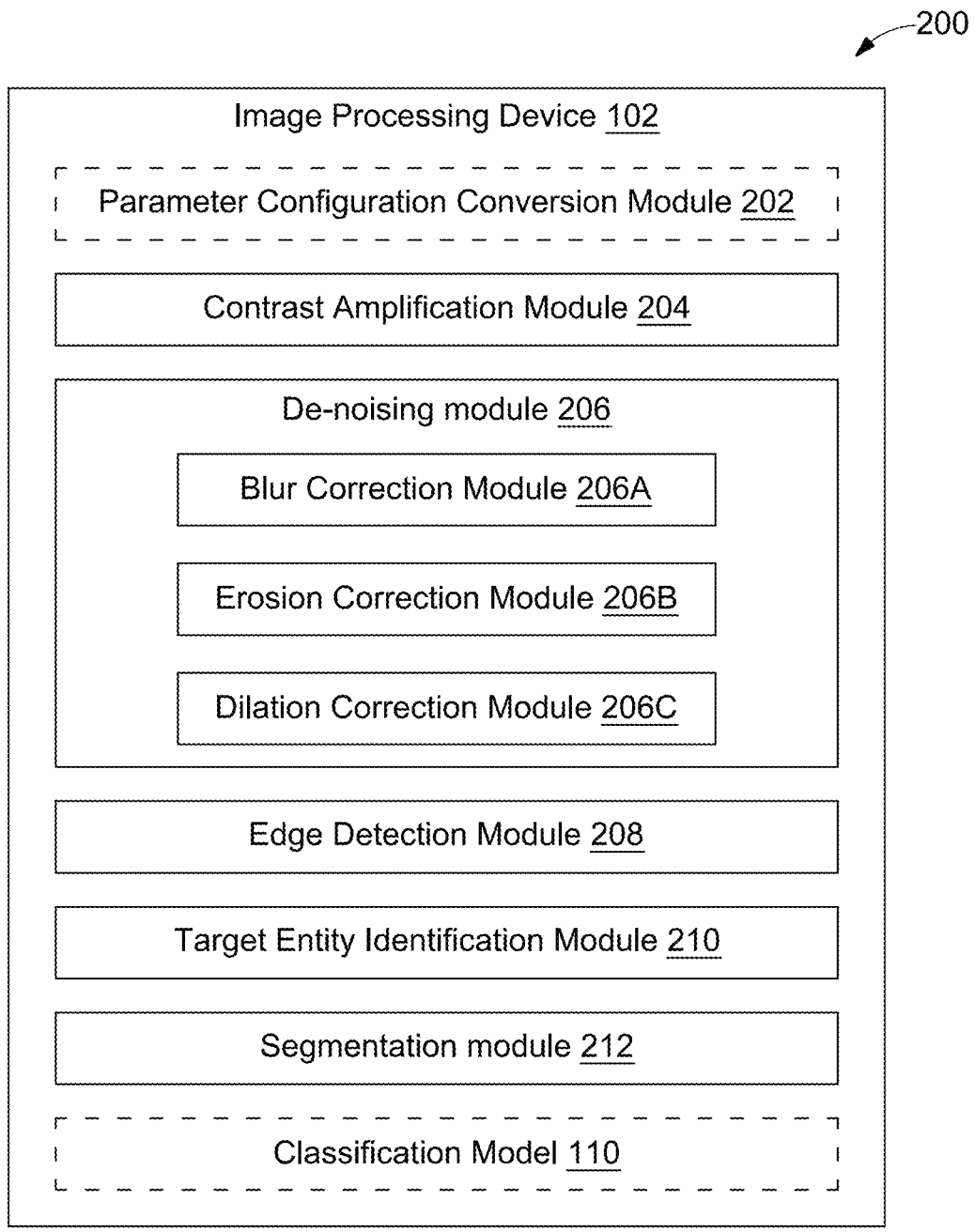
FIG. 2 is a functional block diagram of the image processing device, in accordance with an embodiment of the present disclosure.

Referring now to FIG. 2 a functional block diagram of the image processing device 102 is illustrated, in accordance with an embodiment of the present disclosure. The image processing device 102 may be configured to process the image (for example, smear images) so as to identify target entities (for example, blood cells) within the image, which can further assist in carrying out classification of the target entities to identify the abnormalities associated with the target entities. The image processing device 102 may include a parameter configuration conversion module 202, a contrast amplification module 204, a de-noising module 206, an edge detection module 208, and a target identity identification module 210. In some embodiments, the de-noising module 206 may include a blur correction module 206A, an erosion correction module 206B, and a dilation correction module 206C. In some embodiments, the image processing device 102 may further implement a segmentation module 212. Further, the image processing device 102 may include the classification model 110.

It should be noted that all such aforementioned modules 202-212 may be represented as a single module or a combination of different modules. Further, as will be appreciated by those skilled in the art, each of the modules 202-212 may reside, in whole or in parts, on one device or multiple devices in communication with each other. In some embodiments, each of the modules 202-212 may be implemented as dedicated hardware circuit comprising custom application-specific integrated circuit (ASIC) or gate arrays, off-the-shelf semiconductors such as logic chips, transistors, or other discrete components. Each of the modules 202-212 may also be implemented in a programmable hardware device such as a field programmable gate array (FPGA), programmable array logic, programmable logic device, and so forth. Alternatively, each of the modules 202-212 may be implemented in software for execution by various types of processors. An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

The parameter configuration conversion module 202 may receive an input image. The parameter configuration conversion module 202 may be configured to convert parameter configuration associated with the input image. For example, the input image, as received by the parameter configuration conversion module 202 may have BGR (Blue, Green, Red) parameter configuration. In one example scenario, the parameter configuration conversion module 202 may convert the BGR (Blue, Green, Red) parameter configuration of the input image into LAB (Lightness, a-axis, b-axis) configuration. In another example scenario, the parameter configuration conversion module 202 may convert the BGR (Blue, Green, Red) parameter configuration of the input image into LUV (Lightness, u-axis, v-axis) configuration.

The contrast amplification module 204 may be configured to apply a contrast amplification procedure to a Lightness parameter associated with the input image. Once the parameter configuration of the input image is converted to the LUV (Lightness, u-axis, v-axis) configuration or the LAB (Lightness, a-axis, b-axis) configuration. the amplification module may apply the contrast amplification procedure to the Lightness (L) parameter associated with the input image. By way of an example, the contrast amplification procedure may include Contrast Limited Adaptive Histogram Equalization (CLAHE).

The contrast amplified image may be received by the de-noising module 206 which may remove the unwanted noise from the contrast amplified image. The de-noising module 206 may de-noise the amplified-contrast image by iteratively performing on the amplified-contrast image a blur correction, an erosion correction, and a dilation correction, to obtain a de-noised image corresponding to the amplified-contrast image. To this end, the blur correction module 206A may perform blur correction on the amplified-contrast image. Similarly, the erosion correction module 206B may perform erosion correction on the amplified-contrast image, and the dilation correction module 206C may perform dilation correction on the amplified-contrast image. In some example embodiments, the blur correction, the erosion correction, and the dilation correction may be performed iteratively twice one after the another. It should be noted that the blur correction, the erosion correction, and the dilation correction may be either be performed in a predefined sequence or a random sequence.

The edge detection module 208 may determine from the de-noised image the edges of each of one or more target entities associated with the input image using at least one edge detection model. For example, the at least one edge detection model may include Canny Edge Detector model. As will be understood, the target entities captured within the image may be two-dimensional figures defining respective peripheral edges.

The target entity identification module 210 may identify the one or more target entities within the input image based on the identified edges of each of the one or more target entities from the edge detection module. Further, the target entity identification module 210 may generate a contoured image, based on the identified edges of each of the one or more target entities. For example, the contoured images may include only the contours or edges associated with the one or more target entities within the image and the detailed features of the one or more target entities.

Once the contoured image is obtained from the target entity identification module 210, the contoured image may be further processed to identify the abnormalities associated with the target entities. This can be done by using the classification model 110 which may be implemented in the image processing device 102, in some exemplary embodiments. To this end, the segmentation module 212 may identify a mask associated with each of the one or more target entities associated with the input image using a segmentation model. Further, the segmentation model may generate a mask image comprising the one or more target entities and the mask associated with each of the one or more target entities. By way of an example, the segmentation model may be a Mask-Region-based Convolutional Neural Networks (R-CNN) model. Further, the classification model may be a Convolutional Neural Network (CNN). Additionally, it may be noted that the masked image obtained from the segmentation module 212 and the contoured image obtained from the target entity identification module 210 may be concatenated and fed to the classification model 110. The classification model 110 may perform classification of the one or more target entities into one or more predefined classes. The one or more predefined classes may be associated with one or more entity types. The classification model 110 may therefore perform a final classification of the one or more target entities into one or more predefined classes, the one or more predefined classes being associated with one or more entity types.

Figure 3:
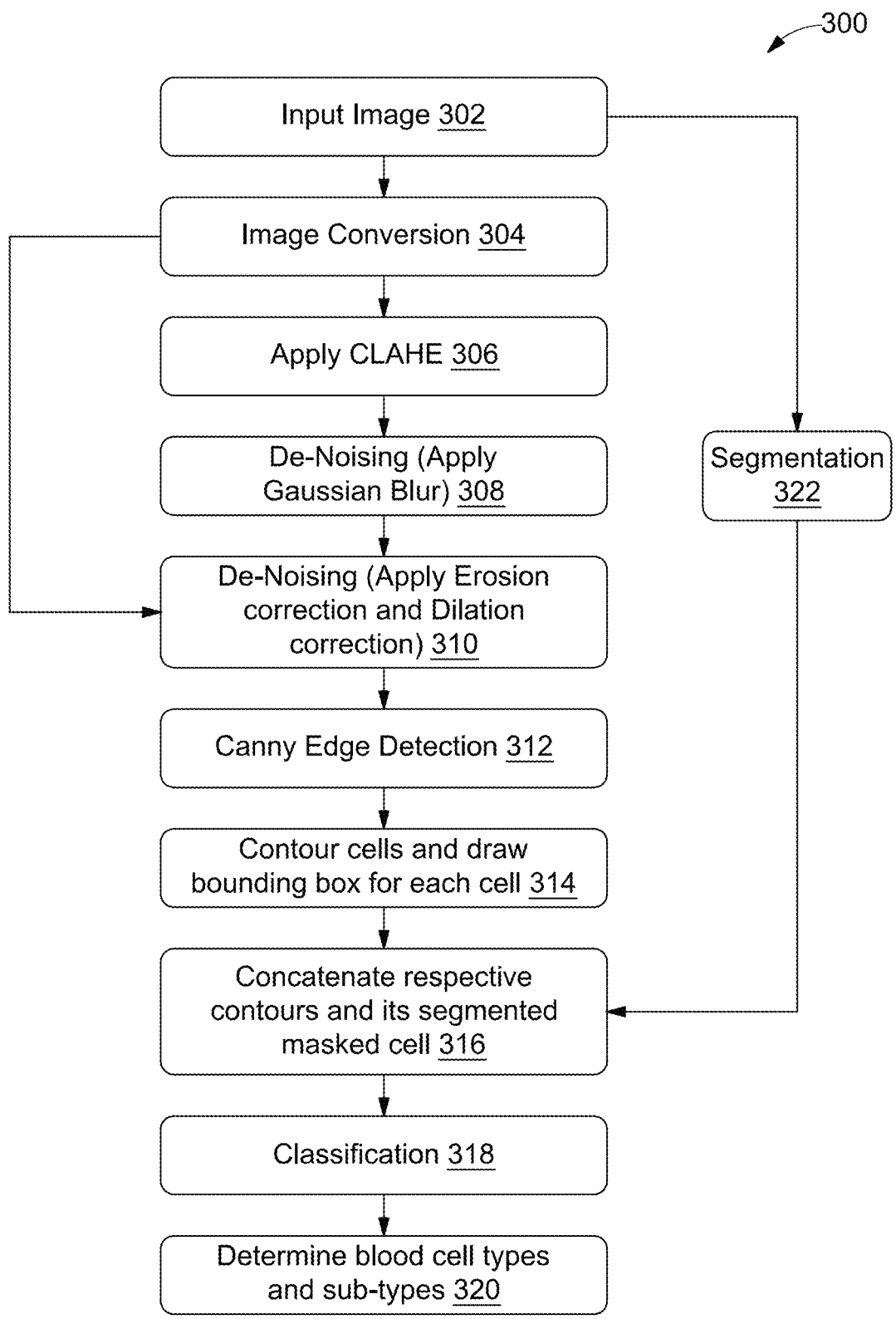
FIG. 3 is a process flow diagram of a process of image processing and classifying target entities within an image, in accordance with an embodiment of the present disclosure.

Referring now to FIG. 3, a process flow diagram of a process 300 of image processing and classifying target entities within an image is illustrated, in accordance with an embodiment of the present disclosure. The process 300 may be performed by or using the image processing device 102.

At step 302, an input image may be obtained. The input image may be obtained using an imaging device, and in particularly a microscope-based camera. The input image may be obtained directly from the imaging device or from a database in which the input is stored upon being obtained by the imaging device. The input image may include target entities. For example, the input may be a smear image of a blood cell which includes images of the blood cells therewithin.

At step 304, a parameter configuration conversion may be applied to the input image. It may be noted that the input image may have a BGR (Blue, Green, Red) parameter configuration. Therefore, at step 304, the BGR (Blue, Green, Red) parameter configuration of the input image may be converted into LAB (Lightness, a-axis, b-axis) configuration and LUV (Lightness, u-axis, v-axis) configuration. In other words, the BGR (Blue, Green, Red) parameter configuration of the input image may be converted into Lightness parameter-based configuration.

At step 306, a contrast amplification procedure may be applied to the Lightness parameter associated with the input image, to amplify contrast of the input image and obtain an amplified-contrast image corresponding to the input image. As a result, at step 306, contrast difference between object and the background may be achieved due to which details in the image may be accentuated. In some example embodiments, the contrast amplification procedure may include Contrast Limited Adaptive Histogram Equalization (CLAHE) performed on the L parameter (i.e. Lightness channel). As will be appreciated by those skilled in the art, the Lightness parameter intensity may range between a level of 0 to 100. The CLAHE technique applied on the L-channel (Lightness) may access the intensity from 0 to 100.

At step 308, de-noising procedure may be applied to the amplified-contrast image by performing blur correction on the amplified-contrast image. In some example embodiments, the blur correction may be based on Gaussian blur technique. At step 310, de-noising procedure may be further applied to the amplified-contrast image, by performing an erosion correction and a dilation correction, to obtain a de-noised image corresponding to the amplified-contrast image. Further, it should be noted that the steps 308 and 310 may be iteratively performing on the amplified-contrast image. For example, the steps 308 and 310 may be performed at least twice. In other words, the blur correction, the erosion correction, and the dilation correction may be performed once to obtain a first noise corrected image, and then the blur correction, the erosion correction, and the dilation correction may be performed once again on the first noise corrected image to obtain the de-noised image. However, it should be noted that the steps 308 and 310 may be performed may be performed iteratively multiple number of times until a sufficiently de-noised image is obtained.

Moreover, it should be noted that once the blur correction is performed, the erosion correction and the dilation correction may be performed in a predefined sequence. That is, in each iterative process, the erosion correction may be performed first followed by the dilation correction, or the dilation correction may be performed first followed by the erosion correction. Alternately, the dilation correction and the erosion correction may be performed in a random sequence, during the multiple different iterations.

At step 312, edges of each of one or more target entities associated with the input image may be determined from the de-noised image. To this end, at least one edge detection model may be used. For example, the at least one edge detection model may include Canny Edge Detector model.

At step 314, the one or more target entities associated with the input image may be identified based on the identified edges of each of the one or more target entities. Based on the one or more target entities identified, a contoured image may be generated. In the contoured image, a bounding box may be drawn around each of the one or more target entities. For example, for a smear image of blood cells, a bounding box may be defined for each blood cell within the smear image.

In some embodiments, at step 322, a segmentation procedure may be performed on the input image, to identify a mask associated with each of the one or more target entities associated with the input image. To this end, a segmentation model, such as a Mask-Region-based Convolutional Neural Networks (R-CNN) model may be used. As a result, a mask image including the one or more target entities and the mask associated with each of the one or more target entities may be generated.

At step 316, the contour image and the mask image may be concatenated. In other words, the contours corresponding to the one or more target entities and the masks associated with the respective one or more target entities may be concatenated, to obtain a concatenated output.

The concatenated output may be fed to the classification model to perform a classification, at step 318. In some example embodiments, the classification model may be a Convolutional Neural Network (CNN). Further, at step 318, a classification may be performed for of the one or more target entities, for classification into one or more predefined classes. The one or more predefined classes may be associated with one or more entity types. For example, for the smear image of the blood cells, the blood cells may be classified may be classified into one or more predefined classes. As will be understood by the those skilled in the art, the classification model may be a pre-trained model, and may have been trained based on training data. The predefined classes may correspond to different cell types, abnormality types, etc. As such, based on the classification, at step 320, the cell types, sub-cell types, and abnormality data may be obtained as an output from the classification model. Therefore, the classification may provide indication about the types of cells that are present in the image, whether there is an abnormality associated with these cells, and the type of abnormality that is associated with the cells. The results of the classification may be displayed to a user via the user interface 108. The user which may be a pathologist or other medical professional may study and derive a conclusion based on the results obtained.

Figure 4:
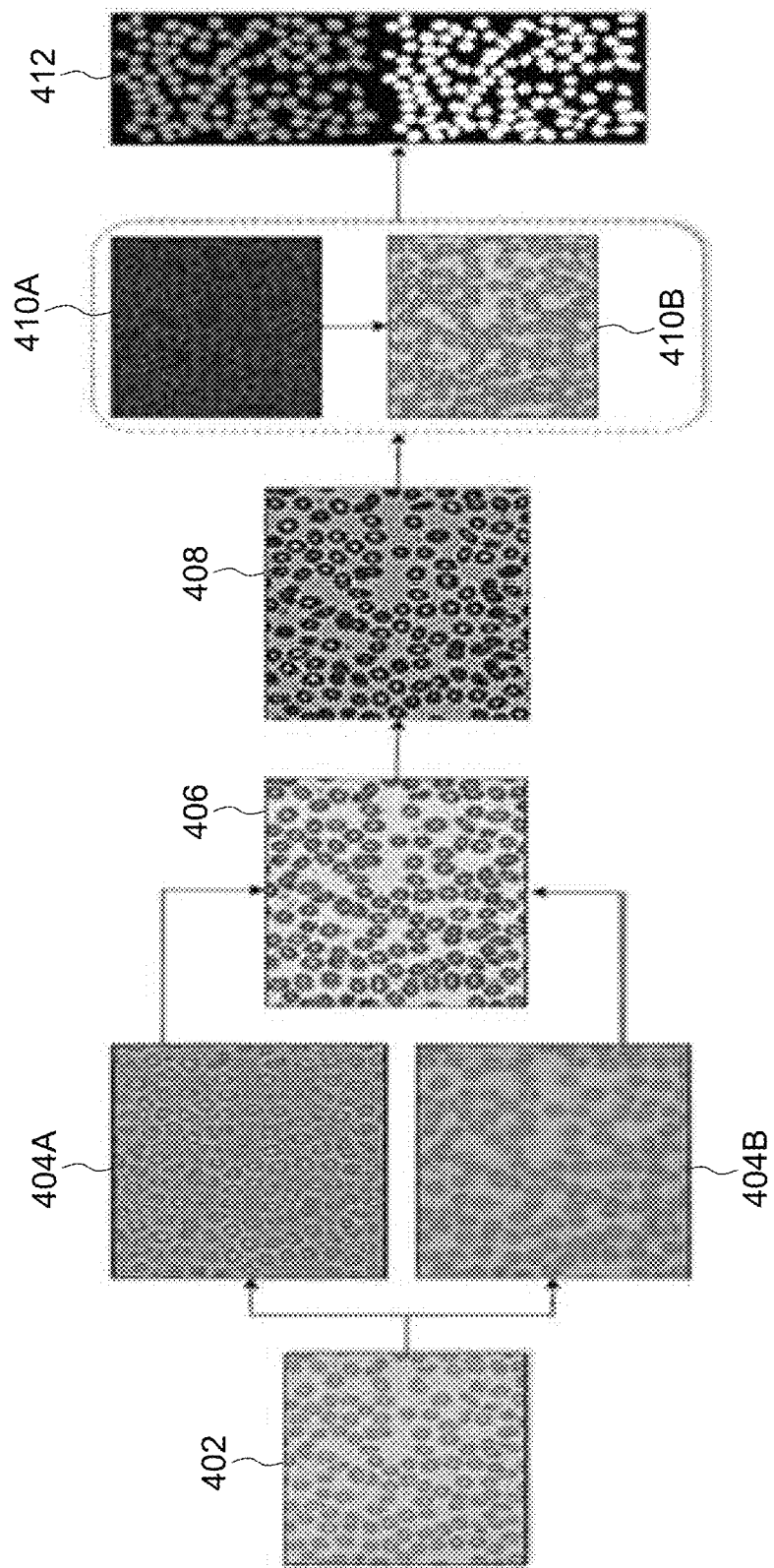
FIG. 4 is a process diagram of a process of image processing for a smear image, in accordance with an embodiment of the present disclosure.

Referring now to FIG. 4, a process diagram of a process 400 of image processing for a smear image (corresponding to the process 300) is illustrated, in accordance with an embodiment of the present disclosure. As shown in FIG. 4, an input (original) smear image 402 of a blood sample may be received. This input smear image 402 may include the microscopic representations of the blood cells of the blood sample.

Thereafter, parameter configuration conversion may be applied to the input smear image 402 which may originally have a BGR (Blue, Green, Red) parameter configuration. The, the BGR (Blue, Green, Red) parameter configuration of the input smear image 402 may be converted into LAB (Lightness, a-axis, b-axis) configuration 404A and LUV (Lightness, u-axis, v-axis) configuration 404B.

Upon the parameter configuration conversion, a contrast amplification procedure may be applied to the Lightness parameter associated with the input smear image 402, to amplify its contrast and obtain an amplified-contrast smear image 406 corresponding to the input smear image 402. For example, the contrast amplification procedure may include Contrast Limited Adaptive Histogram Equalization (CLAHE) performed on the L parameter (i.e. Lightness channel). Thereupon, de-noising procedure may be applied to the amplified-contrast image by performing the blur correction, the erosion correction, and the dilation correction, to obtain a de-noised smear image 408 corresponding to the amplified-contrast smear image 406. As mentioned above, the above step may be performed iteratively (for example, at least twice), until the de-noised smear image 408 is obtained.

Further, edges of each of one or more target entities (i.e. blood cells) associated with the input smear image may be determined in an edge-detected image 410A. To this end, at least one edge detection model, for example, Canny Edge Detector model may be used. Based on the one or more blood cells identified, a contoured image 410B may be generated. In the contoured image 420B, a bounding box may be drawn around each of the one or more blood cells. Furthermore, a mask image 412 corresponding to the input smear image 402 may be obtained. As mentioned above, mask image 412 may be generated by identifying a mask associated with each of the one or more blood cells associated with the input smear image 402 using a segmentation model. The mask image 412 may include the one or more blood cells and the mask associated with each of the one or more blood cells. To this end, a segmentation model, such as a Mask-Region-based Convolutional Neural Networks (R-CNN) model may be used.

Figure 5:
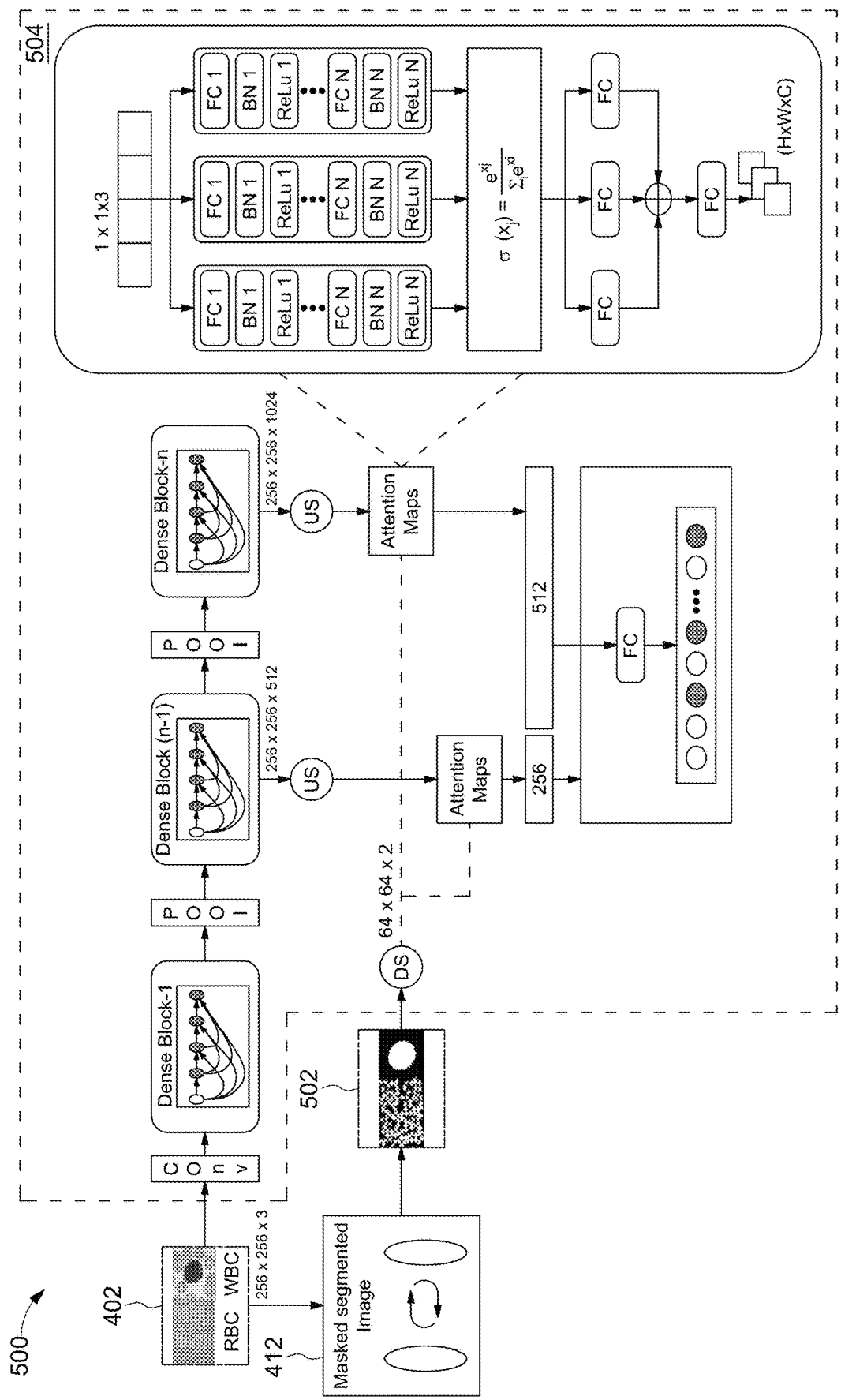
FIG. 5 is a process diagram of a process of classifying blood cells within a smear image, in accordance with an embodiment of the present disclosure.

In continuation to FIG. 4, referring now to FIG. 5, a process diagram of a process 500 of classifying blood cells within a smear image (corresponding to the process 400) is illustrated, in accordance with an embodiment of the present disclosure. As shown in FIG. 5, the input image 402 (corresponding to the contoured image 410B) and a masked segmented image 412 (also referred to as the mask image 412) may be received and concatenated. In particular, the contours corresponding to the one or more blood cells and the masks associated with the respective one or more blood cells may be concatenated, to obtain a concatenated output 502.

The concatenated output 502 may be fed to the classification model 504 to perform a classification. The classification is already explained above. As such, for the input smear image 402, the blood cells may be classified may be classified into one or more predefined classes which may correspond to different cell types, abnormality types, etc. therefore, based on the classification, the cell types, sub-cell types, and abnormality data may be obtained as an output from the classification model 504. The classification may provide indication about the types of cells that are present in the input smear image 402, whether there is an abnormality associated with these cells, and the type of abnormality that is associated with the cells.

Figure 6:
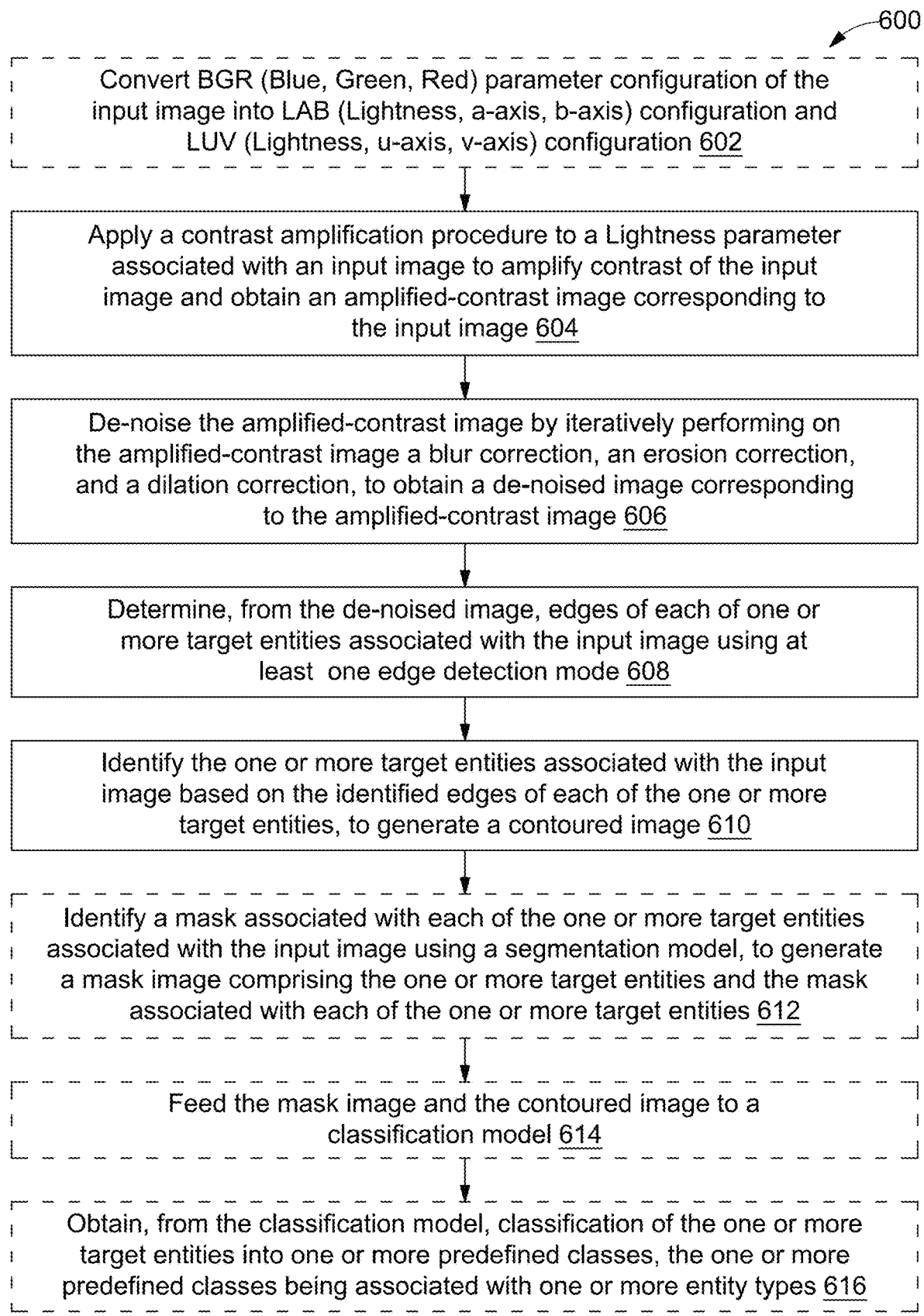
FIG. 6 illustrates a flow chart of a method of image processing and classifying target entities within an image, in accordance with an embodiment of the present disclosure.

Referring now to FIG. 6, a method 600 of image processing and classifying target entities with an image is depicted via a flowchart, in accordance with an embodiment. FIG. 6 is explained in conjunction with FIGS. 1-5. Each step of the flowchart may be executed by various modules (same as the modules of the system 600).

At step 602, a parameter configuration conversion may be performed ion an input image. For example, BGR (Blue, Green, Red) parameter configuration of an input image may be converted into LAB (Lightness, a-axis, b-axis) configuration and LUV (Lightness, u-axis, v-axis) configuration. At step 604, a contrast amplification procedure may be applied to a Lightness parameter associated with the input image. It may be noted that the contrast amplification may amplify contrast of the input image and may obtain an amplified-contrast image corresponding to the input image. For example, the contrast amplification procedure may include Contrast Limited Adaptive Histogram Equalization (CLAHE).

At step 606, the amplified-contrast image may be de-noised by iteratively performing on the amplified-contrast image a blur correction, an erosion correction, and a dilation correction. It may be noted that the iterative processes processed by the processing device may obtain a de-noised image corresponding to the amplified-contrast image. Further, the amplified-contrast image the blur correction, the erosion correction, and the dilation correction may be performed in a predefined sequence. The blur correction, for example, may be based on Gaussian blur technique.

At step 608, edges of each of one or more target entities associated with the input image may be determined from the de-noised image. Further, it may be noted that the de-noised image may be obtained using at least one edge detection model. For example, the at least one edge detection model may include Canny Edge Detector model. At step 610, the one or more target entities associated with the input image may be identified. It may be noted that the identification may be based the identified edges of each of the one or more target entities, to generate a contoured image.

At step 612, a mask associated with each of the one or more target entities associated with the input image may be identified using a segmentation model, to generate a mask image. The mask image may include the one or more target entities and the mask associated with each of the one or more target entities. For example, the segmentation model may be a Mask-Region-based Convolutional Neural Networks (R-CNN) model.

At step 614, the mask image and the contoured image may be fed to a classification model. The classification model, for example, may be is a Convolutional Neural Network (CNN). At step 616, classification of the one or more target entities into one or more predefined classes may be obtained, from the classification model. The one or more predefined classes may be associated with one or more entity types.

It is intended that the disclosure and examples be considered as exemplary only, with a true scope and spirit of disclosed embodiments being indicated by the following claims.

The invention claimed is:

1. A method of image processing and classifying target entities with an image, the method comprising:
   applying a contrast amplification procedure to a Lightness parameter associated with an input image, to amplify contrast of the input image and obtain an amplified-contrast image corresponding to the input image;
   de-noising the amplified-contrast image by iteratively performing on the amplified-contrast image a blur correction, an erosion correction, and a dilation correction, to obtain a de-noised image corresponding to the amplified-contrast image;
   determining, from the de-noised image, edges of each of one or more target entities associated with the input image using at least one edge detection model; and
   identifying the one or more target entities associated with the input image based on the identified edges of each of the one or more target entities, to generate a contoured image,
   wherein the method further comprising:
   converting BGR (Blue, Green, Red) parameter configuration of the input image into LAB (Lightness, a-axis, b-axis) configuration and LUV (Lightness, u-axis, v-axis) configuration;
   identifying a mask associated with each of the one or more target entities associated with the input image using a segmentation model, to generate a mask image comprising the one or more target entities and the mask associated with each of the one or more target entities;
   feeding the mask image and the contoured image to a classification model; and
   obtaining, from the classification model, classification of the one or more target entities into one or more predefined classes, the one or more predefined classes being associated with one or more entity types.

2. The method as claimed in claim 1, wherein the at least one edge detection model comprises Canny Edge Detector model.

3. The method as claimed in claim 1, wherein the segmentation model is a Mask-Region-based Convolutional Neural Networks (R-CNN) model.

4. The method as claimed in claim 1, wherein the classification model is a Convolutional Neural Network (CNN).

5. The method as claimed in claim 1, wherein the contrast amplification procedure comprises Contrast Limited Adaptive Histogram Equalization (CLAHE).

6. The method as claimed in claim 1, wherein the de-noising comprises:
   iteratively performing on the amplified-contrast image the blur correction, the erosion correction, and the dilation correction in a predefined sequence,
      wherein the blur correction is based on Gaussian blur technique.

7. A system for image processing and classifying target entities with an image, the system comprising:
   a processor; and
   a memory communicatively coupled with the processor, the memory storing processor-executable instructions, which on execution, cause the processor to:
      apply a contrast amplification procedure to a Lightness parameter associated with an input image, to amplify contrast of the input image and obtain an amplified-contrast image corresponding to the input image;
      de-noise the amplified-contrast image by iteratively performing on the amplified-contrast image a blur correction, an erosion correction, and a dilation correction, to obtain a de-noised image corresponding to the amplified-contrast image;
      determine, from the de-noised image, edges of each of one or more target entities associated with the input image using at least one edge detection mode; and
      identify the one or more target entities associated with the input image based on the identified edges of each of the one or more target entities, to generate a contoured image,
   wherein the processor-executable instructions further cause the processor to:
      convert BGR (Blue, Green, Red) parameter configuration of the input image into LAB (Lightness, a-axis, b-axis) configuration and LUV (Lightness, u-axis, v-axis) configuration;
      identify a mask associated with each of the one or more target entities associated with the input image using a segmentation model, to generate a mask image comprising the one or more target entities and the mask associated with each of the one or more target entities;
      feed the mask image and the contoured image to a classification model; and
      obtain, from the classification model, classification of the one or more target entities into one or more predefined classes, the one or more predefined classes being associated with one or more entity types.

8. A non-transitory computer-readable medium storing computer-executable instructions for image processing and classifying target entities with an image, the stored computer-executable instructions, when executed by a processor, cause the processor to perform the steps of:
   applying a contrast amplification procedure to a Lightness parameter associated with an input image, to amplify contrast of the input image and obtain an amplified-contrast image corresponding to the input image;
   de-noising the amplified-contrast image by iteratively performing on the amplified-contrast image a blur correction, an erosion correction, and a dilation correction, to obtain a de-noised image corresponding to the amplified-contrast image;
   determining, from the de-noised image, edges of each of one or more target entities associated with the input image using at least one edge detection model; and
   identifying the one or more target entities associated with the input image based on the identified edges of each of the one or more target entities, to generate a contoured image,
   wherein the stored computer-executable instructions when executed by the processor further causes the processor to perform the steps of:
   converting BGR (Blue, Green, Red) parameter configuration of the input image into LAB (Lightness, a-axis, b-axis) configuration and LUV (Lightness, u-axis, v-axis) configuration;
   identifying a mask associated with each of the one or more target entities associated with the input image using a segmentation model, to generate a mask image comprising the one or more target entities and the mask associated with each of the one or more target entities;

feeding the mask image and the contoured image to a classification model; and obtaining, from the classification model, classification of the one or more target entities into one or more predefined classes, the one or more predefined classes being associated with one or more entity types.

9. The non-transitory computer-readable medium of claim 8, wherein the at least one edge detection model comprises Canny Edge Detector model.

10. The non-transitory computer-readable medium of claim 8, wherein the segmentation model is a Mask-Region-based Convolutional Neural Networks (R-CNN) model.

11. The non-transitory computer-readable medium of claim 8, wherein the contrast amplification procedure comprises Contrast Limited Adaptive Histogram Equalization (CLAHE).

12. The non-transitory computer-readable medium of claim 8, wherein the de-noising comprises:

iteratively performing on the amplified-contrast image the blur correction, the erosion correction, and the dilation correction in a predefined sequence, wherein the blur correction is based on Gaussian blur technique.

* * * * *